(12) United States Patent
Kennedy et al.

(10) Patent No.: US 8,292,221 B2
(45) Date of Patent: *Oct. 23, 2012

(54) AIRCRAFT EQUIPMENT SUPPORT

(75) Inventors: Othar P. Kennedy, Colorado Springs, CO (US); Ryan Stuart Porter, Monument, CO (US); Keith Michael Ferguson, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/029,567

(22) Filed: Feb. 17, 2011

(65) Prior Publication Data
US 2011/0133030 A1    Jun. 9, 2011

Related U.S. Application Data

(63) Continuation-in-part of application No. 12/048,646, filed on Mar. 14, 2008, now Pat. No. 7,905,450.

(60) Provisional application No. 60/908,359, filed on Mar. 27, 2007.

(51) Int. Cl.
*B64D 11/06* (2006.01)
(52) U.S. Cl. .................... 244/118.1; 244/122 R
(58) Field of Classification Search ............ 244/118.1, 244/118.2, 118.6, 122 R; 248/424, 425; 29/344.1, 344.11, 337
See application file for complete search history.

(56) References Cited

U.S. PATENT DOCUMENTS

| 2,933,127 | A | | 4/1960 | Brewster |
| 4,184,656 | A | * | 1/1980 | Wakeley .................... 244/118.6 |
| 4,725,031 | A | | 2/1988 | Simin |
| 6,543,848 | B1 | | 4/2003 | Suga et al. |
| 6,834,834 | B2 | | 12/2004 | Dazet et al. |
| 7,905,450 | B2 | * | 3/2011 | Kennedy et al. ........... 244/118.1 |
| 2002/0096602 | A1 | | 7/2002 | Dazet et al. |

FOREIGN PATENT DOCUMENTS

| EP | 1227034 A1 | 7/2002 |
| EP | 1698509 A1 | 9/2006 |
| GB | 746313 A | 3/1956 |

* cited by examiner

*Primary Examiner* — Tien Dinh
*Assistant Examiner* — Michael Kreiner
(74) *Attorney, Agent, or Firm* — Jerry J. Holden; John D. Titus (57) ABSTRACT

A support for an aircraft seat, table or other piece of equipment has a lower support link that sweeps out a lateral arc. The lower support link cooperates with a conventional linear track to support the piece of equipment. The linear track provides fore/aft movement substantially orthogonal to a line tangent to the center of the lateral arc. A pilot link is operatively attached to the piece of equipment to form a four-bar linkage that maintains the equipment in a predetermined rotational attitude as the lower support link sweeps out its lateral arc.

6 Claims, 8 Drawing Sheets

AIRCRAFT EQUIPMENT SUPPORT

CROSS-REFERENCE TO RELATED APPLICATION

The application is a continuation-in-part of U.S. application Ser. No. 12/048,646 filed on Mar. 14, 2008 now U.S. Pat. No. 7,905,450, which claims priority of U.S. provisional application No. 60/908,359 filed on Mar. 27, 2007.

BACKGROUND OF THE INVENTION

The present invention relates to aircraft interior equipment and, more particularly, to equipment supports for seats, tables and the like.

Aircraft manufacturers often require business class passenger seats in their aircraft that can translate in the fore/aft and lateral directions for occupant comfort and convenience. The tracking mechanism that provides this function must be robust enough to withstand various use/abuse loads, in-flight gust loads, and crash loads without mechanical failure. Conventional state of the art tracking mechanisms commonly employ two sets of linear tracks consisting of parallel tubes or rails arranged in a rectangular array, two rails for lateral movements and the other two rails for fore/aft movement. The rails used in these conventional orthogonal linear track systems are typically spaced far apart for structural stability. Because of this, it is almost always necessary when locking the position of the seat after a move, that all four rails be locked. If not, the resultant unbalanced moment loads exerted by the occupant can create an undesirable "spongy" feel. This characteristic can be mitigated by employing increasingly heavier and larger elements (e.g., larger rails, larger bearings, etc.). Large and heavy, however, are always undesirable in aircraft seat design where space and weight are at a premium.

Having to lock all four rails of conventional orthogonal linear track arrangements also complicates the control mechanism because of the need to simultaneously lock four separate locations with, typically, a single-hand control. Lateral motion in an orthogonal linear track design is also limited by the width of the seat and the internal real estate required to lock the lateral rails. To increase the lateral range of motion, it is necessary to increase the width of the seat to accommodate the longer rails. Accordingly, what is needed is a support mechanism for aircraft seats and other equipment that provides orthogonal axes of motion without the large footprint and the weight problems associated with conventional orthogonal linear track designs.

SUMMARY OF THE INVENTION

The present invention solves the foregoing problem by providing a support that moves angularly rather than linearly for at least one of the axes of motion. According to an illustrative embodiment, the equipment support has a sturdy lower support link that sweeps out a lateral arc. The lower support link supports a platform that has a conventional linear track. The linear track provides for fore/aft movement substantially orthogonal to a line tangent to the center of the lateral arc. A lightweight pilot link is attached to the platform to form a parallelogram linkage that maintains the platform in a rotationally fixed attitude as the lower support link sweeps out its lateral arc. This gives the lateral movement a quasi-linear feel even if the fore/aft linear track is locked. If the fore/aft linear track is unlocked, the lateral movement can be purely linear. In an alternative embodiment, the lower link supports the equipment support directly. The lower link, in turn, is supported by a frame mounted to a conventional linear track to provide fore/aft movement to complement the lateral arc movement provided by the lower link.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

The drawing figures are intended to illustrate to the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1-5, equipment support 10 comprises a base member 12, which is adapted to be rigidly affixed to a frame 14. Frame 14 is provided with a plurality of devises 16 which allow frame 14 to be rigidly mounted to an aircraft floor or other surface. Frame 14 may also be attached to the aircraft by means of conventional floor tracking or other means and therefore is not limited to the pin and clevis attachment of the illustrative embodiment. A support link 18 is mounted to base 12 by means of a rotating joint 20 comprising a shaft 22 supported by a thrust bearing 24 fitted to a corresponding recess in base 12 so that support link 18 is free to rotate about a vertical axis 26 defined by thrust bearing 24. Support link 18 is preferably formed of a lightweight material such as aluminum alloy or carbon fiber, such that support link 18 is capable of supporting the entire weight of an occupied passenger seat or other equipment mounted to support link 18.

Figure 1:
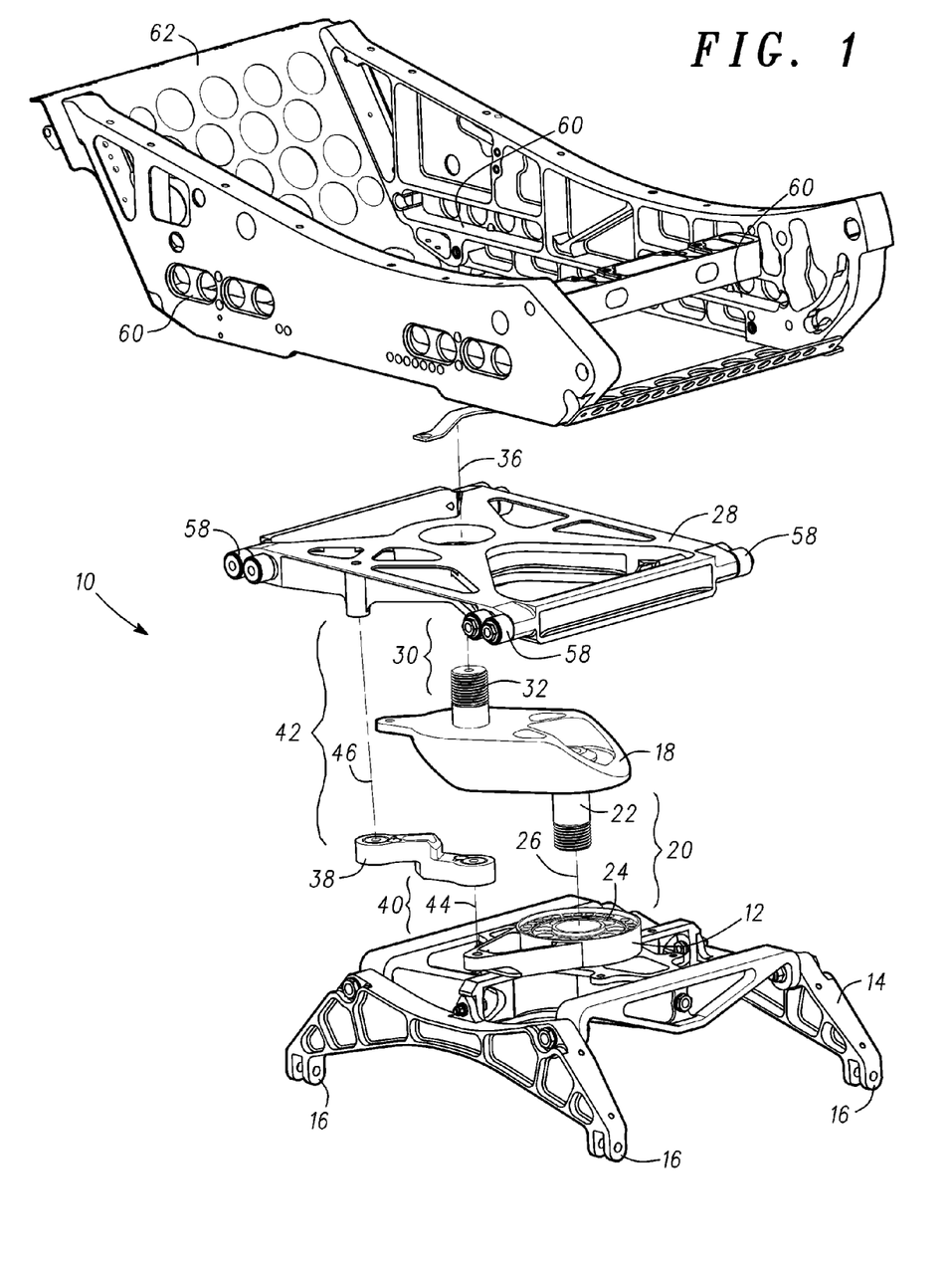
FIG. 1 is an exploded perspective view of a first embodiment of an equipment support incorporating features of the present invention.

An equipment platform 28 is mounted to support link 18 by a means of a second rotating joint 30 consisting of shaft 32 and a corresponding thrust bearing (not shown) fitted to a corresponding recess in equipment platform 28 so that equipment platform is free to rotate about a second vertical axis 36 defined by shaft 32.

As can be determined from the foregoing, the two rotational axes about shafts 22 and 32 enable equipment platform 28 to sweep through an arc having a radius equal to the offset between the first vertical axis 26 and the second vertical axis 36. In order to maintain equipment platform 28 in a fixed rotational attitude relative to base 12, a pilot link 38 is attached between equipment platform 28 and base 12 by means of a third rotating joint 40 and a fourth rotating joint 42, so that pilot link 38 rotates about a third vertical axis 44 that is parallel to and offset from first vertical axis 26 while equipment platform 28 rotates about a fourth vertical axis 46 that is offset from and parallel to second vertical axis 36. Because support link 18 is capable of supporting the entire load, pilot link 38 supports none (or only a negligible amount) of the vertical or lateral loads exerted by equipment platform 28, and instead resists only rotational loads. Therefore, pilot link 38 can be of much lighter construction than support link 18. Accordingly, rotating joints 40 and 42 may be conventional light duty ball or even sleeve bearings.

Figure 2:
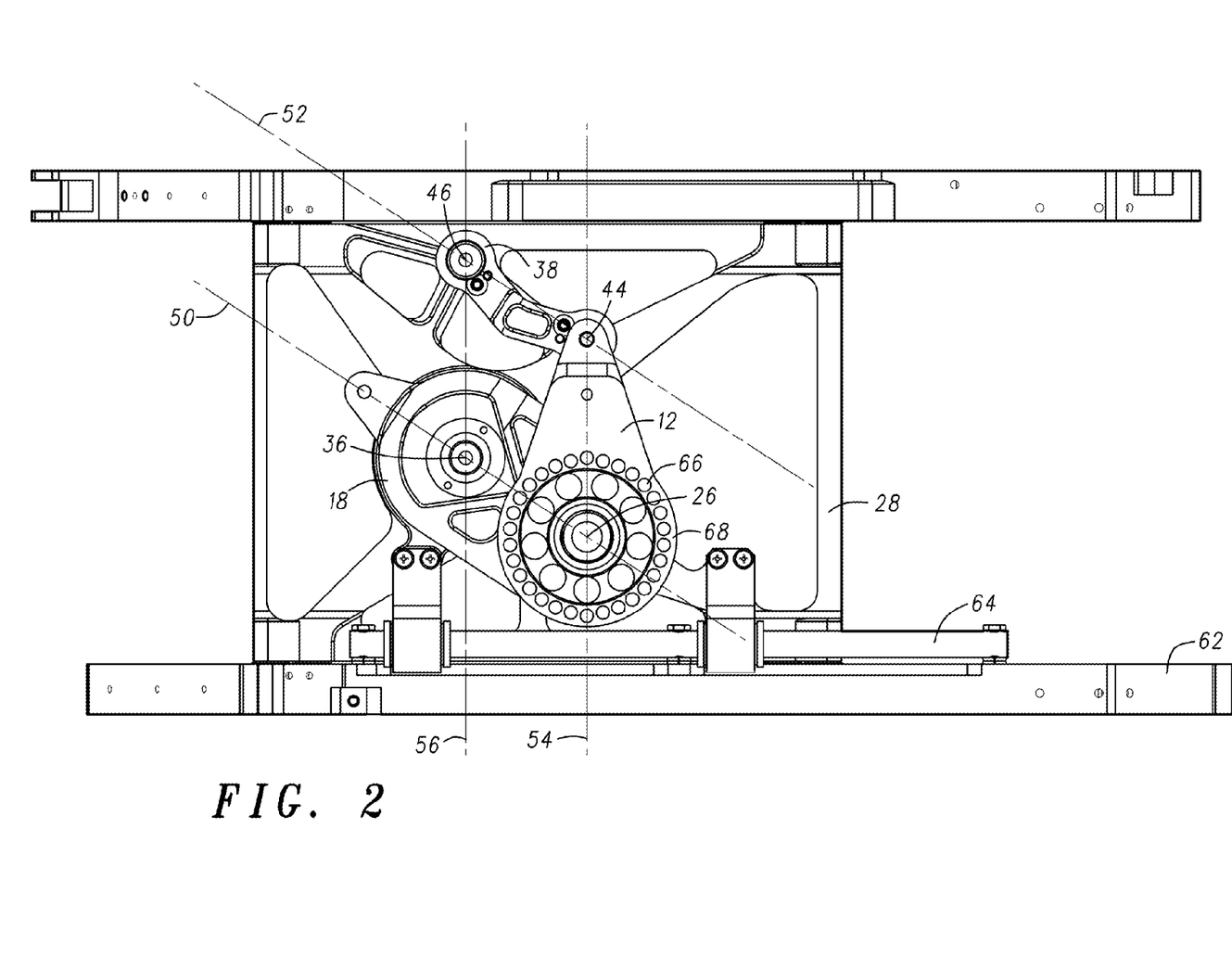
FIG. 2 is a bottom view of the embodiment of FIG. 1 in its extreme left forward position.
Figure 3:
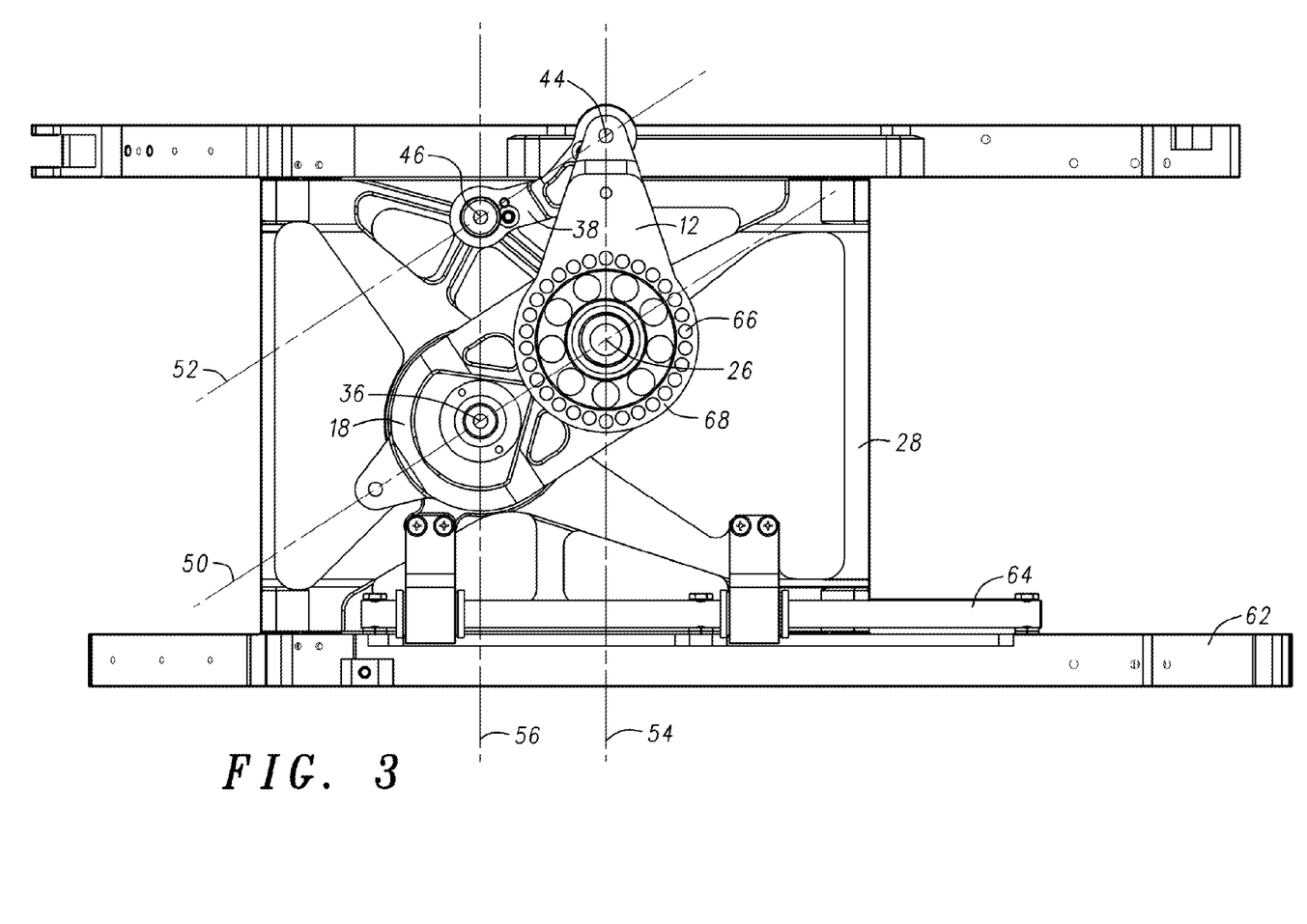
FIG. 3 is a bottom view of the embodiment of FIG. 1 in its extreme right forward position.
Figure 4:
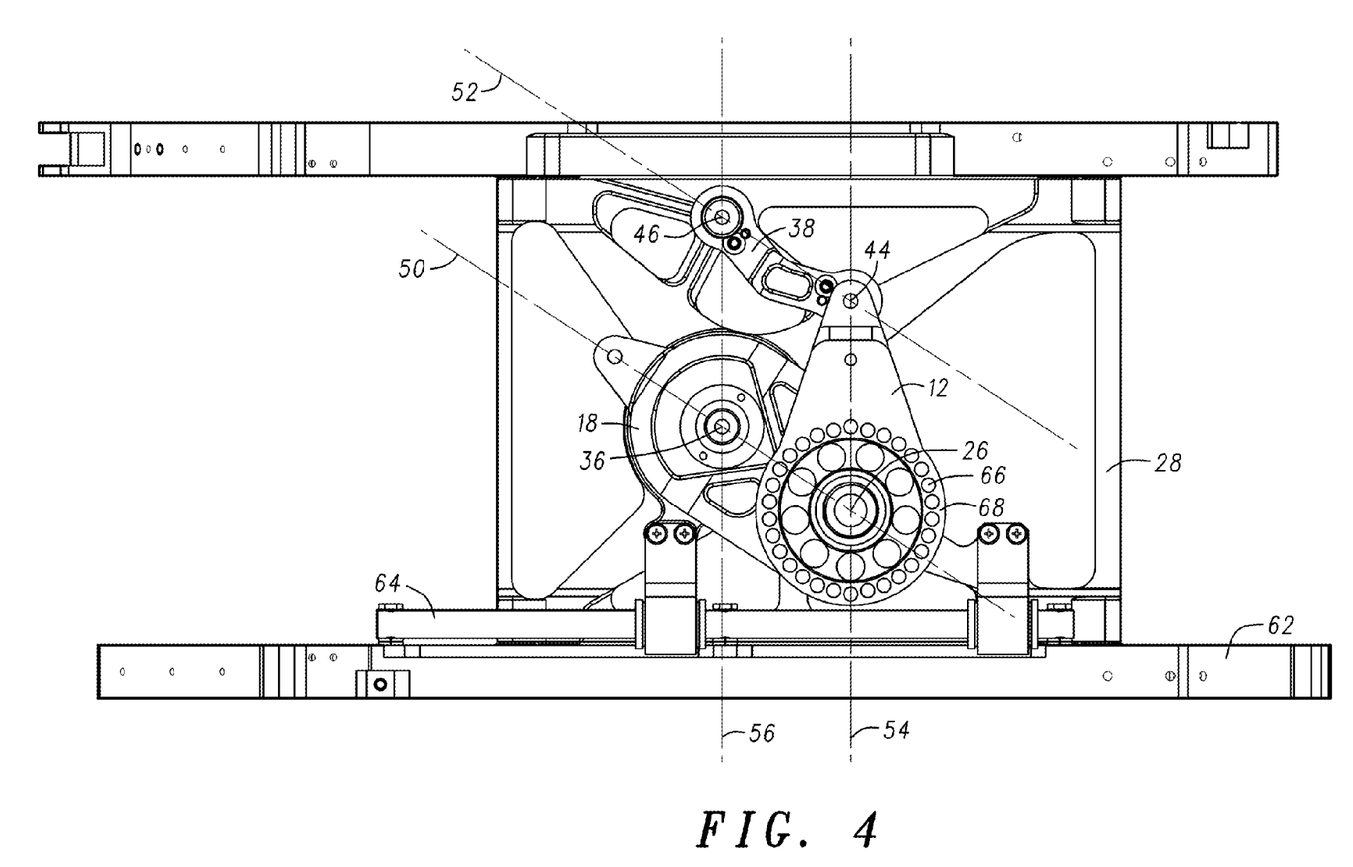
FIG. 4 is a bottom view of the embodiment of FIG. 1 in its extreme left rear position.
Figure 5:
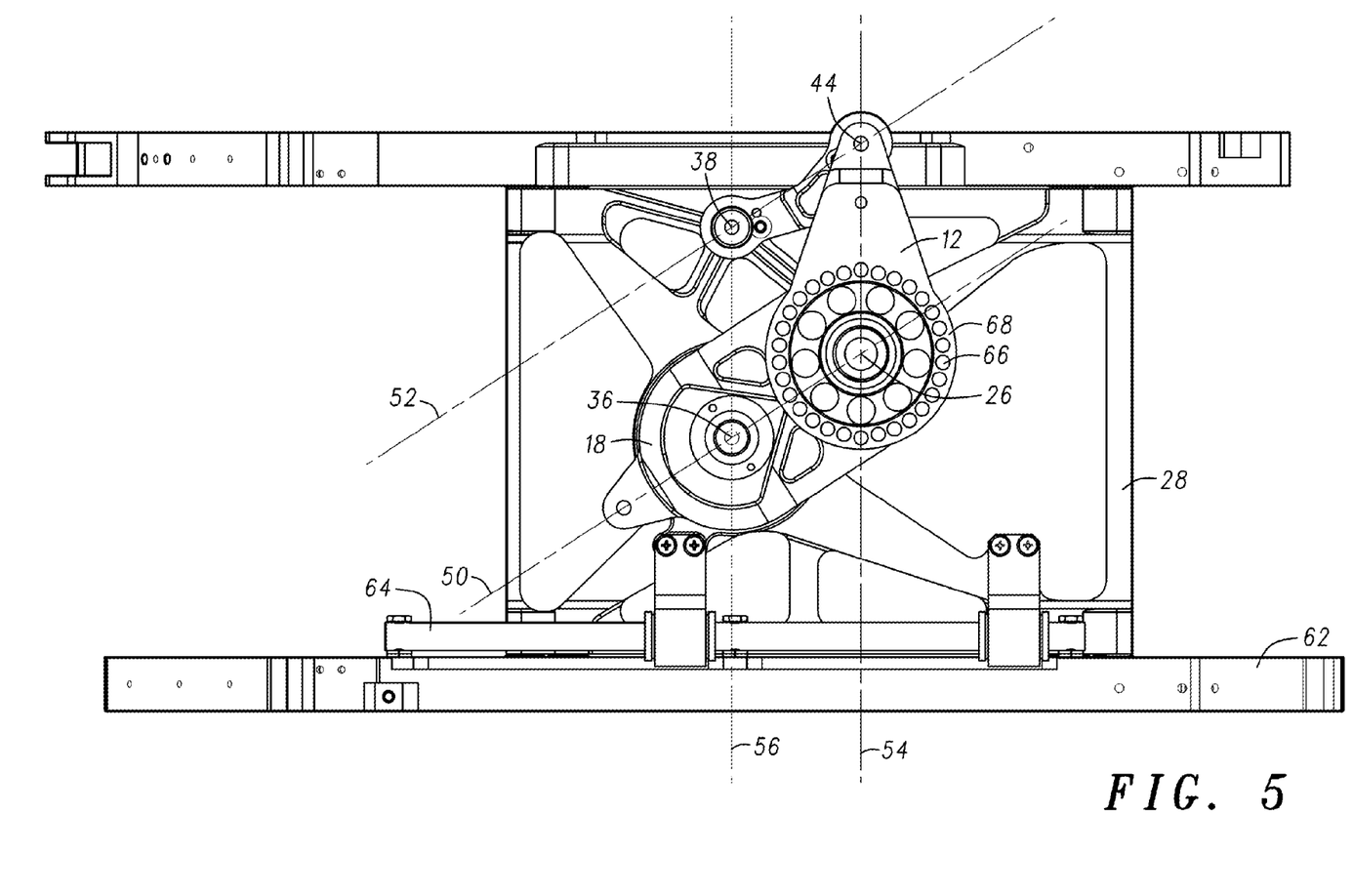
FIG. 5 is a bottom view of the embodiment of FIG. 1 in its extreme right rear position.

With particular reference to FIGS. 2-4, which depict the full range of motion of the illustrative embodiment, the length of pilot link 38 (defined as the distance between third vertical axis 44 and fourth vertical axis 46) is selected to be the same as the length of support link 18 (defined as the distance between first vertical axis 26 and second vertical axis 36). The offset between first vertical axis 26 and third vertical axis 44 is also selected to be the same as the offset between second vertical axis 36 and fourth vertical axis 46. Accordingly when assembled, the longitudinal axis 50 of support link 18 (defined as the line of axis through first vertical axis 26 and second vertical axis 36) is parallel to the longitudinal axis 52 of pilot link 38 (defined as a line of action passing through third vertical axis 44 and fourth vertical axis 46). Similarly, the longitudinal axis 54 of base 12 (defined as a line of action passing through first vertical axis 26 and third vertical axis 44) is parallel to the effective longitudinal axis 56 of equipment support 28 (defined as a line of action passing through second vertical axis 36 and fourth vertical axis 46).

As can be determined from the foregoing, the geometry of the linkage ensures that longitudinal axes 50 and 52 are parallel at all times irrespective of the rotational position of support link 18 and pilot link 38. Accordingly, the effective longitudinal axis of equipment support 28, and with it support 28 itself, is always maintained in a fixed rotational attitude relative to longitudinal axis 54 of base 12. Although in the illustrative embodiment the geometry of the linkage is selected to produce a parallelogram linkage, for other applications (e.g., conference tables in larger business aircraft) a trapezoidal or other unequal arm linkages may be incorporated to produce predetermined angular and/or translational motion of equipment platform 28 as a function of lateral movement without departing from the scope of the present invention.

As can be determined from the foregoing, support link 18 and pilot link 38 cooperate to permit equipment platform 28 to move left and right relative to base 12 through an arc that approximates the left to right movement enabled by much heavier and more complex linear seat tracks of the prior art. To provide fore and aft movement, equipment platform 28 is provided with a plurality of rollers 58 that engage corresponding tracks 60 formed in seat frame 62. Because seat frame 62 is necessarily longer than it is wide, there is sufficient room within the confines of seat frame 62 to incorporate full fore/aft movement without track 60 or rollers 58 extending beyond the footprint of the seat frame itself. The combination, however, of the linear track comprising rollers 58 and track 60 with the support linkage comprising support link 18 and pilot link 38 considerably simplifies the release mechanism. This is because the lateral movement of equipment platform 28 may be controlled by locking support link 18 rotationally, for example by means of a pin engaging one of a plurality of holes 66 formed in metering plate 68 attached to base 12 or by other means that lock the single support link 18 rotationally, rather than locking two parallel rails simultaneously as in the prior art.

Figure 6:
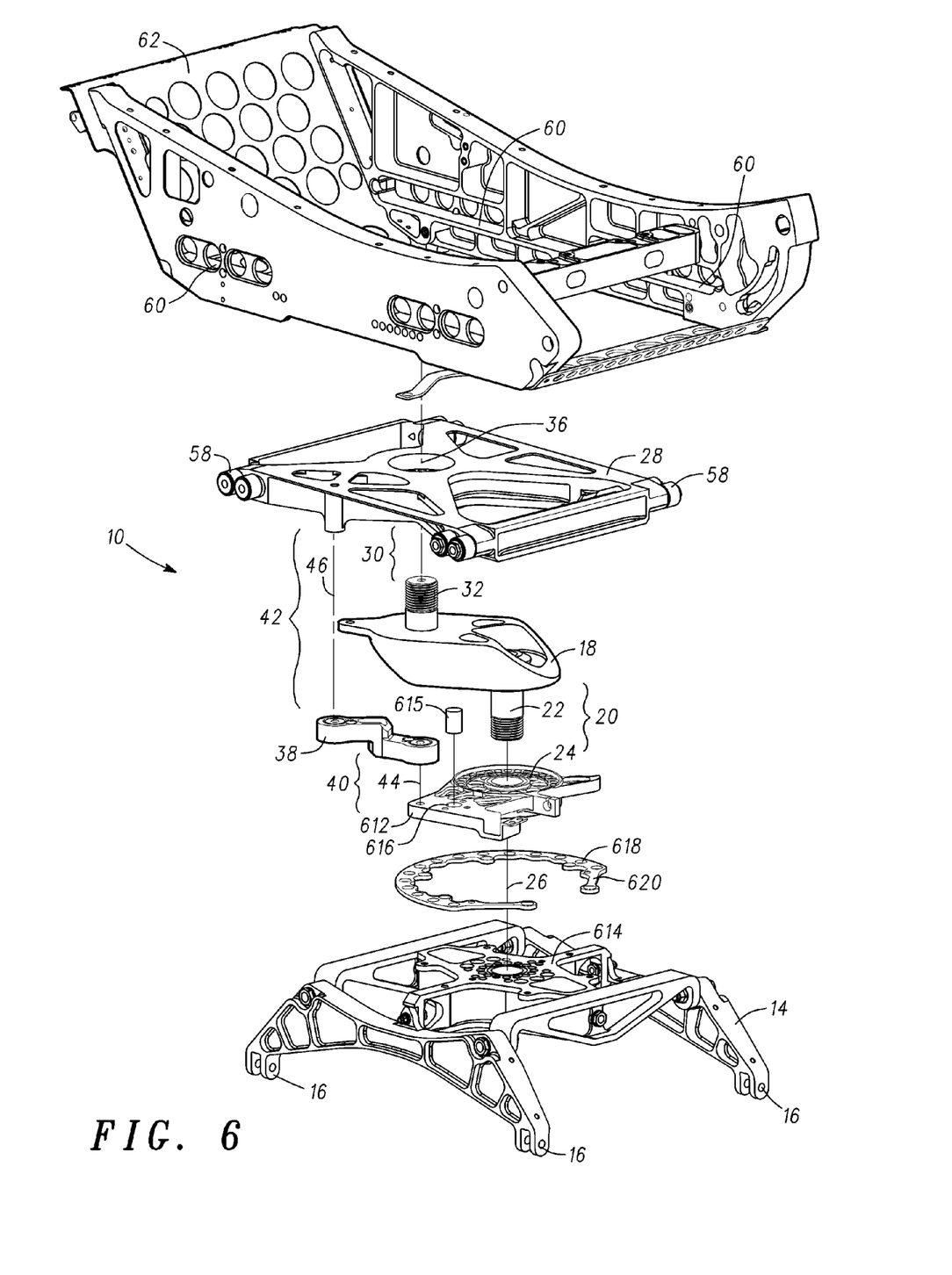
FIG. 6 is an exploded perspective view of a second embodiment of an equipment support including a rotating sub-base member.

With Reference now to FIG. 6, the ability of seat frame 62 to swivel may be provided by substitution of a sub-base 612 in place of the rigidly mounted base 12 of the embodiment of FIG. 1. As with base 12, sub-base 612 includes a thrust bearing 24 for supporting support link 18 as well as an attachment point for third rotating joint 40 of pivot link 38. Additionally, however, the lower surface of sub-base 612 includes a thrust bearing (not shown) coaxial with thrust bearing 24. The thrust bearing of sub-base 612 rides on the upper surface 614 of frame 14 thus enabling the entirety of equipment support 10 to rotate as a unit about frame 14. A distinct advantage of this arrangement is the fore/aft and lateral adjustment axes of equipment support 10 rotate with seat frame 62 rather than remaining fixed with respect to the floor of the aircraft. This allows for much more intuitive movement of the seat frame by the user than would otherwise be possible. Once adjusted, the rotational movement of sub-base 612 may be locked by moving lock pin 615 through guide hole 616 to engage one of a plurality of holes 618 in metering plate 620 attached to frame 14.

Figure 7:
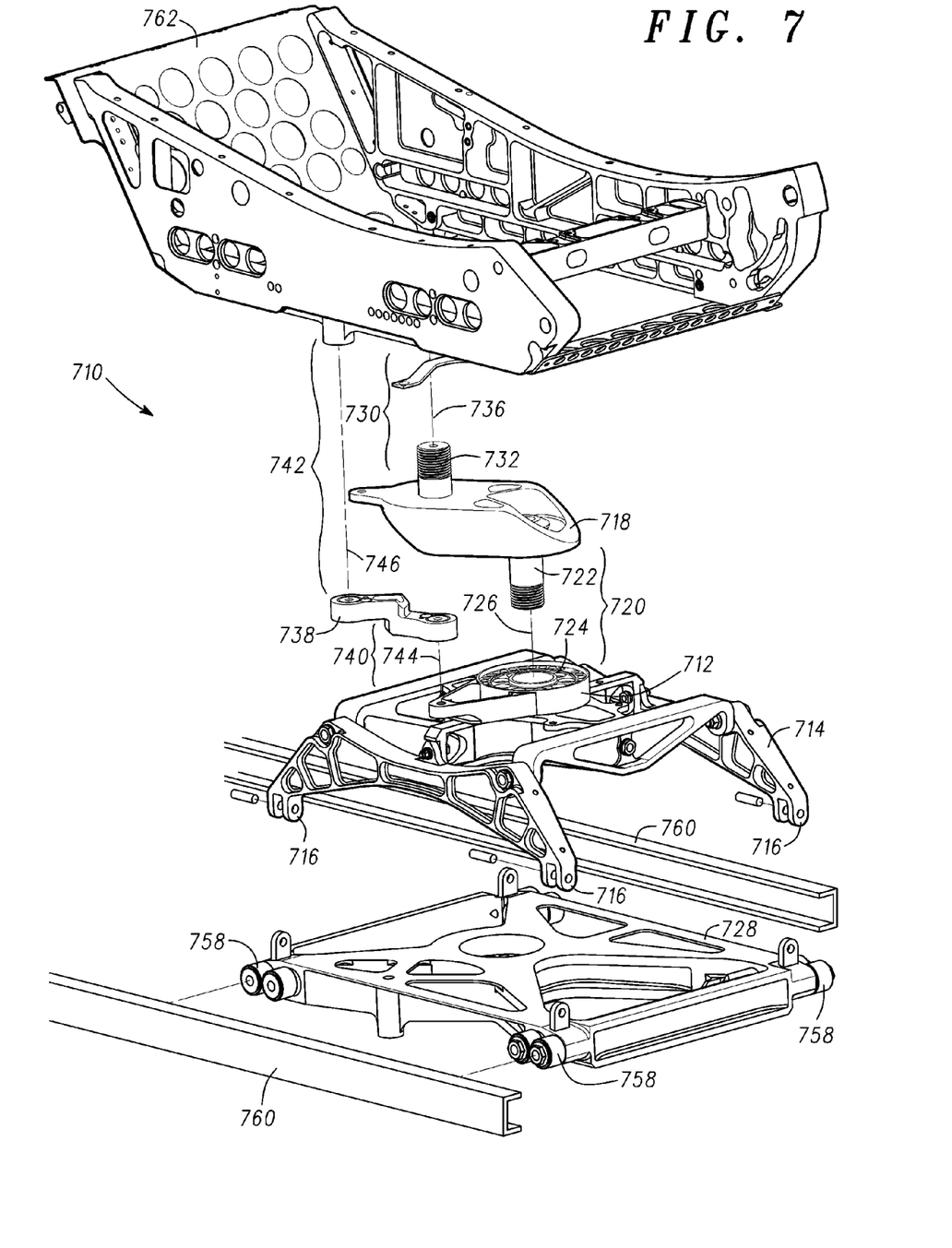
FIG. 7 is an exploded perspective view of a third embodiment of an equipment support including a linear track attaching the equipment support to the airframe.

With reference now to FIG. 7, an alternative embodiment of an equipment support 710 comprises a base member 712 which is adapted to be rigidly affixed to a frame 714. Frame 714 is provided with a plurality of devices 716 which allow frame 714 to be rigidly mounted to a platform 728. To provide fore and aft movement, platform 728 is provided with a plurality of rollers 758 that engage corresponding tracks 760 which are rigidly mounted to an aircraft floor or other surface. Frame 714 may also be attached to platform 728 by welding and/or platform 728 may be integrally formed with frame 714. Accordingly, it is not intended that the invention be limited to the pin and device attachment of the illustrative embodiment.

Support link 718 is mounted to base 712 by means of a rotating joint 720 comprising a shaft 722 supported by a thrust bearing 724 fitted to a corresponding recess in base 712 so that support link 718 is free to rotate about a vertical axis 726 defined by thrust bearing 724. An equipment platform such as seat frame 762 is mounted to support link 718 by means of a second rotating joint 730 consisting of shaft 732 and a corresponding thrust bearing (not shown) fitted to a corresponding recess in seat frame 762 so that seat frame 762 is free to rotate about a second vertical axis 736 defined by shaft 732.

Figure 8:
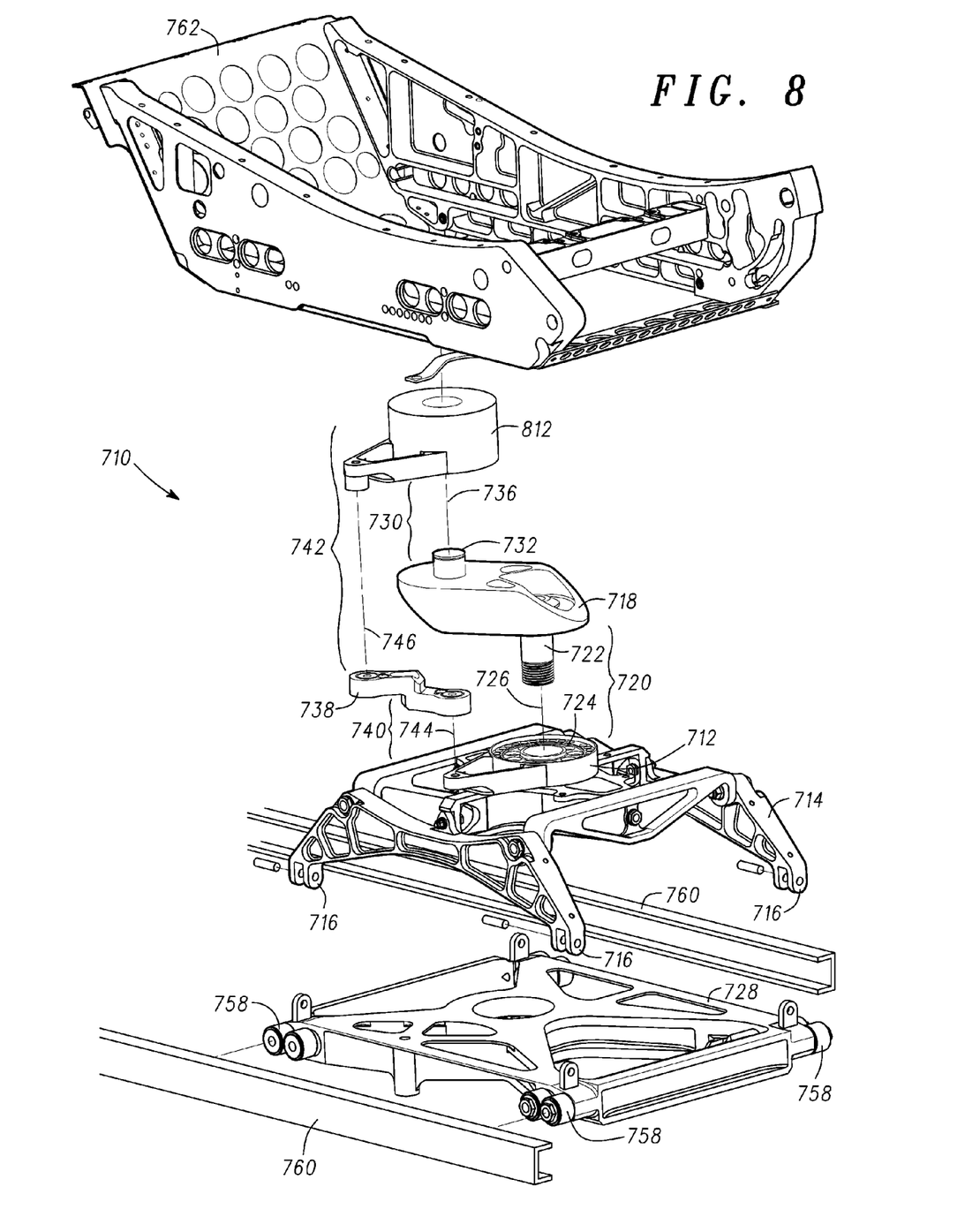
FIG. 8 is an exploded perspective view of a fourth embodiment of an equipment support including a linear track attaching the equipment support to the airframe and an additional bearing support.

As can be determined from the foregoing, the two rotational axes about shafts 722 and 732 enable seat frame 762 to sweep through an arc having a radius equal to the offset between the first vertical axis 726 and the second vertical axis 736. In order to maintain seat frame 762 in a predetermined rotational attitude relative to base 712, a pilot link 738 is attached between seat frame 762 and the base 712 by means of a third rotating joint 740 and a fourth rotating joint 742, so that pilot link 738 rotates about a third vertical axis 744 that is parallel to and offset from first vertical axis 726 while seat frame 762 rotates about a fourth vertical axis 746 that is offset from and parallel to second vertical axis 736. As with the previous embodiments, because support link 718 is capable of supporting the entire load, pilot link 738 supports none (or only a negligible amount) of the vertical or lateral loads exerted by seat frame 762. Instead, pilot link 738 resists only rotational loads and, therefore, can be of much lighter construction than support link 718. In an additional embodiment as shown in FIG. 8, a bearing support 812 with an additional thrust bearing may be disposed between seat frame 762 and support link 718 to enable seat frame 762 to swivel independently of support link 718.

As can be determined from the foregoing, support link 718 and pilot link 738 cooperate to permit seat frame 762 to move left and right relative to frame 714 through an arc that approximates the left to right movement enabled by much heavier and more complex linear seat tracks of the prior art. Simultaneously, platform 728 provides a complementary fore and aft movement.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. An equipment support for securing aircraft interior equipment to an airframe comprising:
   a base adapted to be attached to the airframe, said base having an upper portion and a lower portion;
   a lower support link rotationally attached to the upper portion of said base, said lower support link having a fixed end and a free end, said fixed end of said lower support link comprising a first rotating joint defining a first axis of rotation about said base, said first axis of rotation being oriented substantially vertically relative to said airframe, said free end of said lower link having a second rotating joint thereon defining a second axis of rotation parallel to and offset from said first axis of rotation, said lower support link having a longitudinal axis passing through said first and second axes of rotation;
   a pilot link, said pilot link having a fixed end and a free end, said fixed end of said pilot link comprising a third rotating joint defining a third axis of rotation relative to said base, said third axis of rotation being parallel to and offset from said first axis of rotation, said free end of said pilot link having a fourth rotating joint thereon defining a fourth axis of rotation, said pilot link having a second longitudinal axis passing through said third and fourth axes of rotation;
   an equipment platform, said equipment platform rotationally attached to said lower support link at said second rotating joint and to said pilot link at said fourth rotating joint to form a four bar linkage for defining a rotational attitude of said equipment platform as said lower support link rotates about said first axis of rotation;
   a linear track attached to said equipment platform; and
   an aircraft interior equipment member attached to said linear track.

2. An equipment support for securing aircraft interior equipment to an airframe comprising:
   a linear track attached to the airframe;
   base slidingly engaging said linear track, whereby said base is moveable linearly with respect to said airframe, said base having an upper portion and a lower portion;
   a lower support link rotationally attached to the upper portion of said base, said lower support link having a fixed end and a free end, said fixed end of said lower support link comprising a first rotating joint defining a first axis of rotation about said base, said first axis of rotation being oriented substantially vertically relative to said airframe, said free end of said lower link having a second rotating joint thereon defining a second axis of rotation parallel to and offset from said first axis of rotation, said lower support link having a longitudinal axis passing through said first and second axes of rotation;
   a pilot link, said pilot link having a fixed end and a free end, said fixed end of said pilot link comprising a third rotating joint defining a third axis of rotation relative to said base, said third axis of rotation being parallel to and offset from said first axis of rotation, said free end of said pilot link having a fourth rotating joint thereon defining a fourth axis of rotation, said pilot link having a second longitudinal axis passing through said third and fourth axes of rotation; and
   an equipment platform operatively attached to said lower support link at said second rotating joint and to said pilot link at said fourth rotating joint to form a four bar linkage for defining a rotational attitude of said equipment platform as said lower support link rotates about said first axis of rotation.

3. The equipment support of claim 2, wherein:
   said lower support link and said pilot link cooperate to form a parallelogram linkage, whereby said equipment platform is maintained in a rotationally fixed attitude as said lower support link rotates about said first axis of rotation.

4. The equipment support of claim 2, further comprising:
   a first rotation lock coupled to said lower support link, said first rotation lock being moveable from a disengaged position to an engaged position for engaging said base to prevent rotation of said lower support link about said base.

5. The equipment support of claim 2, wherein:
   said pilot link is of substantially lighter construction than said lower support link.

6. The equipment support of claim 2, further comprising:
   a bearing support member operatively disposed between said lower support link and said equipment platform, said bearing support member comprising a thrust bearing for enabling said equipment platform to rotate about a vertical axis independent of said lower support link.

* * * * *